Dec. 1, 1936.  A. H. STEWART  2,062,620
METHOD OF AND APPARATUS FOR FEEDING GLASS
Filed March 5, 1935
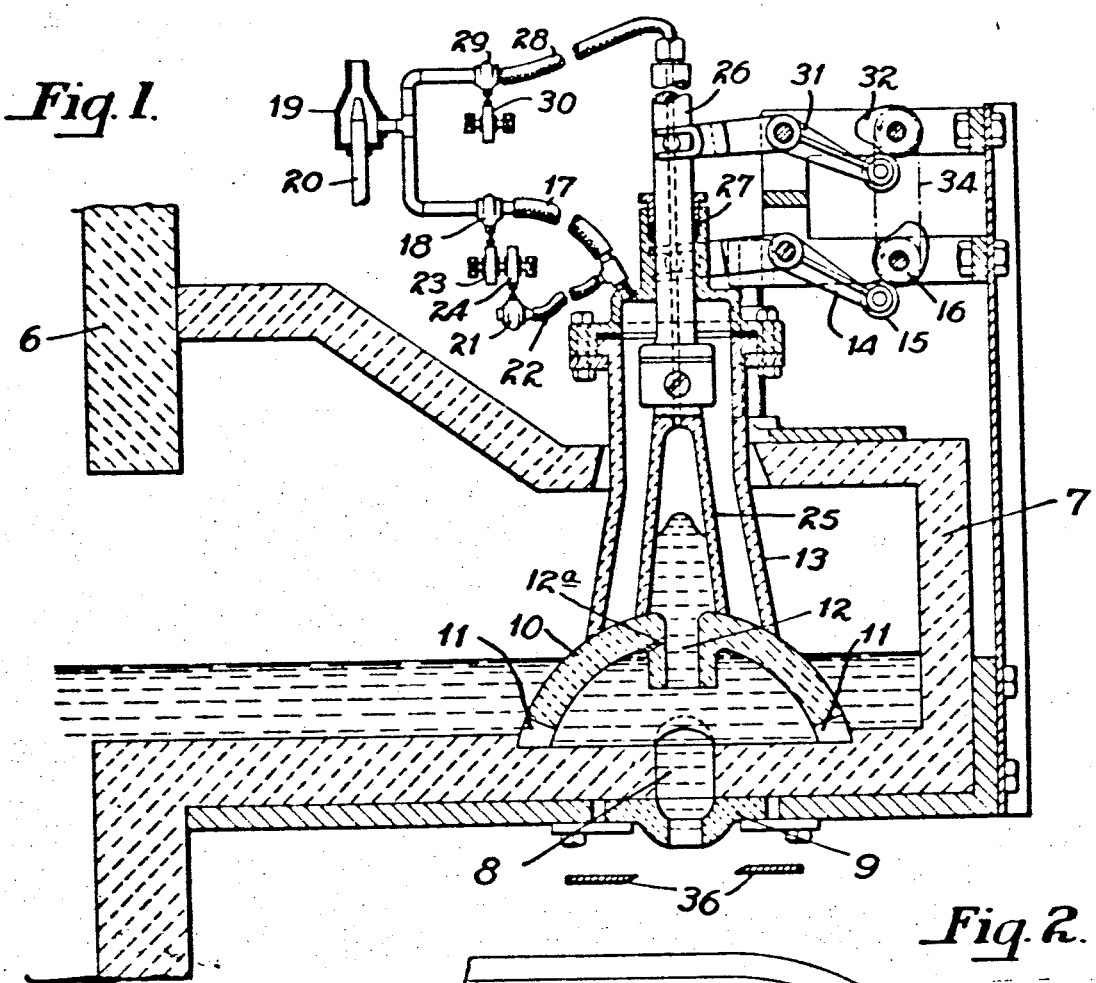
Fig. 1.
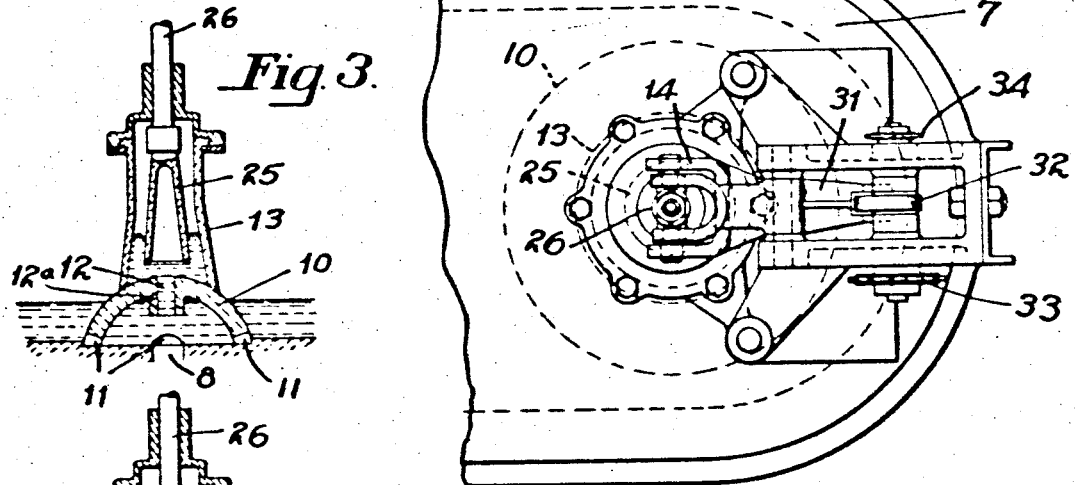
Fig. 2. Fig. 3. Fig. 4.
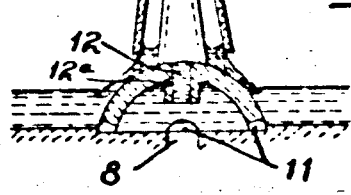
INVENTOR
Andrew H. Stewart,
By Archworth Martin,
Attorney.

Patented Dec. 1, 1936

2,062,620

UNITED STATES PATENT OFFICE 2,062,620

METHOD OF AND APPARATUS FOR FEEDING GLASS

Andrew H. Stewart, Shields, Pa., assignor to Ball Brothers Company, Muncie, Ind., a corporation of Indiana Application March 5, 1935, Serial No. 9,440

12 Claims. (Cl. 49—55)

My invention relates to a method of and apparatus for the forming and feeding of charges of molten glass to be used in molds or otherwise.

One object of my invention is to provide means for forming mold charges through the use of pneumatic suctional pulsations, in such manner that glass, at a feeding orifice through which it is fed, is not subjected to any expulsive force, but only to restricted gravity flow.

Another object of my invention is to control glass flow through an orifice and effect necking of the mold charges, only by variation of suctional forces.

Still another object of my invention is to provide means for the circulation of molten glass in the vicinity of a feeding orifice, by variable pneumatic impulses, to thereby produce an improved stirring action, and to permit the forming of mold charges which are of uniform temperature throughout.

A further object of my invention is to effect better control of glass gob formation at hotter temperatures, by means operable to effect restriction of gravity flow, in varying degrees throughout the cycle of each gob-forming operation, to thereby more effectively control the shapes and sizes of the gobs, notwithstanding changes in temperature of the glass.

One form which my invention may take is shown in the accompanying drawing wherein Figure 1 is a longitudinal sectional view through a portion of a glass furnace and the feeding apparatus; Fig. 2 is a plan view thereof; Fig. 3 is a view diagrammatically representing a portion of Fig. 1, on a reduced scale, but at a different stage in the feeding cycle; and Fig. 4 is a similar view showing parts at another stage of the feeding cycle.

A portion of a glass furnace is represented by the numeral 6, and the boot or forehearth thereof is represented by the numeral 7. The boot is provided with an opening 8 in its bottom that serves as an orifice, and an orifice ring or bushing 9 is detachably connected to the boot, so that the bushings can be readily changed in cases of repairs or replacements, with rings of different diameters.

A dome 10 of clay or other suitable refractory material is placed above the orifice and seats within a recess formed in the bottom of the boot so that it will be held against shifting. The dome is provided with a series of openings 11, through which glass may flow from the pool into the dome, and thence find its way through the orifice 8. The dome has an opening 12 in its upper side through which glass is drawn at variable rates in an upward direction, in connection with control of feeding movements of the glass, and to effect circulation of the glass in the vicinity of the orifice. A vent 12a is provided, to prevent the entrapment of air beneath the dome.

An outer bell 13 is periodically raised from and lowered onto the dome by means of a lever 14 which has a cam roller 15 that is engaged by a cam 16. A suction line 17 has connection with the bell 13, and is controlled by a valve 18 so as to periodically create sub-atmospheric conditions of variable intensity within the bell. The suctional or vacuum force is shown as created by a Venturi device 19, air pressure being supplied through a pipe 20 from a suitable source of pressure. An ordinary vacuum pump can be substituted for the venturi, if desired.

At certain stages in the feeding cycle, it will be desired to create a condition of atmospheric pressure within the bell 13. This condition is effected by closure of the valve 18 and opening of a valve 21, which will admit atmospheric air to the interior of the bell, through a pipe 22. The valves 18 and 21 are actuated by cams 23 and 24, respectively, that in turn have driving connection with the cam 16, or in any event, they will be driven in timed relation to the raising and lowering movements of the bell 13, as will be hereinafter explained.

A bell 25 is positioned within the bell 13, and has a stem 26 by which the bell may be raised and lowered, the stem 26 passing through a stuffing box 27 that prevents leakage of air into the bell 13. Suction is created within the bell 25 through a pipe 28 that is controlled by a valve 29 which is actuated by a cam 30. The bell 25 is raised and lowered by means of a lever 31 that is oscillated by a cam 32. The cams 16 and 32 are mounted on suitable shafts. A sprocket wheel 33 drives one of the shafts, and there is a sprocket chain connection 34 between the shafts so that the first-named shaft will drive the other shaft.

It is also possible to change the speed of raising and lowering the bell 25 independently of the bell 13, and vice versa, by suitable cam changes, but in no case is either bell lifted from its seat before the other bell is seated.

The cams 16, 23, 24, 30 and 32 may ordinarily be driven from a single source of power, and will be operated in timed relation to shears 36 that are employed for severing charges of glass below the orifice.

The pool of glass will ordinarily be at approximately the level shown in the drawing, and will flow into the dome 10 through the openings 11. Assuming that glass is flowing through the orifice 8, the bells 13 and 25 are caused to occupy the positions shown in Fig. 3, at which time a sharp suctional force is created within the bell 13, through opening of the valve 18 and closing of the valve 21. Thereupon, the glass will be drawn up sharply, such upward movement being transmitted somewhat to the glass that is suspended from the orifice, and thereby effecting a necking or slight reduction in diameter of the glass at approximately the line of shear.

The shears are brought together to sever the depending mass of glass for the purpose of forming mold charges or the like. The suctional force, in addition to drawing glass back slightly at the lower side of the orifice, will draw the glass into the dome through the openings 11, and upwardly through the opening 12 into the bell 13, as shown in Fig. 3. The suctional force is sharply applied for a brief period, so that the inertia to flow of the glass through the openings 11 will result in the required suctional impulse in the orifice 8, which can be of sufficient force to pull the shear stub back into the orifice.

Just at the completion of the necking and shearing operation, the bell 25 will be lowered to its seat, and the valve 18 will be closed and the valves 21 and 29 opened—sufficient suction being provided in the bell 25 to cause some upward flow of glass through the opening 12, and at the same time, the bell 13 is raised by its cam 16 to the position shown in Fig. 4.

By the operation of the valve 29 sufficient suction is maintained in the bell 25 to keep a small quantity of glass flowing upwardly through the opening 12 until the other portion of the glass above the dome is discharged beneath the lower edge of the raised bell 13, as shown in Fig. 4. During this time glass flows through the orifice 8 to form a gob. When the bell 13 has been unloaded or freed of its glass, it is again lowered to its seat and suction applied just before the bell 25 raised, so that another suctional impulse can be imparted to the glass which meanwhile has moved downwardly through the orifice 8, and the operations just described are thereupon repeated.

It will be seen that at no time is super-atmospheric pressure applied to the glass above the orifice, since only suctional impulses are created within the bells, and there is never any down flow of the glass through the opening 12. The glass is therefore permitted to exude through the orifice 8 only by restricted gravity flow, and charges of more uniform weight and contour will be formed than in those cases where propulsive forces are applied to form suspended masses of glass below an orifice.

Another advantage of the structure arises from the fact that there is circulation of a major portion of the glass through the openings 11, upwardly through the opening 12, and down the upper sloping side of the dome.

There is thus such circulation of the glass as will secure intermingling of hotter and cooler portions thereof, thus making for better shaped mold charges, and reducing danger of streaks or unevenness in the ware that is produced from the mold charges.

This arrangement for securing circulation of glass by variations in suctional forces is superior to mechanical stirring devices that tend to create bubbles in the glass, and cause impurities to be stirred into the glass being fed.

It will be understood that the suction applied to either bell may be sufficient only to retard flow through the orifice instead of effecting actual reverse flow therein. Also, if a quick suctional force is created in the outer bell, there will be greater retraction at the orifice than in the case of a slower application of suctional force. A prolonged force will, of course, cause greater quantities of glass to be drawn upwardly through the dome. Unloading of the outer bell, as shown in Fig. 4, can be effected more quickly if air pressure instead of atmospheric pressure is admitted through the pipe 22; for fast operations, I may employ super-atmospheric pressure at that point.

While I may at times so arrange the vacuum cycles within the bells to hold the glass stationary in the opening 12 at certain stages of the cycle, I prefer to cause the glass to move upwardly through the opening 12 at all times, and arrange the intensities of the suctional forces to accomplish this, so that I have at all times in some measure restricted gravity action on the glass issuing through the orifice 8.

I claim as my invention:—

1. The method which comprises causing a flow of molten glass from a pool to a zone above an orifice, allowing a portion of the stream to flow through the orifice, withdrawing a portion of the glass upwardly from said zone and discharging it laterally into said pool.

2. The method which comprises causing a flow of molten glass from a pool to a zone above an orifice, allowing a portion of the stream to flow through the orifice, withdrawing a portion of the glass upwardly from said zone and discharging it laterally into said pool, the withdrawal force being periodically applied by variations in suction which are sufficient also to periodically retard flow through the orifice.

3. The method of feeding molten glass, which comprises causing glass to flow from a pool, through an orifice, under restricted gravity flow, into the form of a mass below the orifice, applying to the glass above the orifice suctional impulses of varying degree sufficient to raise the glass above the pool level and to neck the said mass, shearing the glass in a plane adjacent to the orifice, and causing that portion of the glass above the pool level to flow laterally into the pool.

4. The method of feeding molten glass, which comprises causing glass to flow from a pool past an orifice below the pool, permitting a portion of the glass to flow through the orifice and form a mass below the orifice, directing another portion of the glass upwardly and laterally into the main body of the pool, and severing the said mass below the orifice.

5. The combination with a receptacle for a pool of molten glass, having an orifice in its lower side, of means providing a restricted zone above said orifice, into which glass may flow from the said pool, means for creating suction on the surface of the glass in said pool to create upward movement of a portion of the glass at varying rates and to retard discharge through the orifice, and means effective upon reduction of the suctional force, for directing the upwardly drawn glass into the pool exteriorly of said zone.

6. The combination with a receptacle for a pool of molten glass, having an orifice in its lower side, of a dome positioned above the orifice and having restricted communication with said pool and also having an opening in its upper portion, a bell above said opening, a second bell disposed circumferentially of the first-named bell, means for vertically moving said bells alternately, into and out of engagement with the dome, and means for effecting variable pneumatic impulses within the bells.

7. The combination with a receptacle for a pool of molten glass, having an orifice in its lower side, of a bell positioned above said orifice, a second bell surrounding the first-named bell, means for alternately reciprocating said bells in timed relation to each other, and means operative in timed relation to said movements for creating variable pneumatic impulses within the bells.

8. The combination with a receptacle for a pool of molten glass, having an orifice in its lower side, of a bell positioned above said orifice, a second bell surrounding the first-named bell, seating surfaces for said bells, means for vertically moving said bells into and out of engagement with their seats, and means operative in timed relation to said movements for creating pneumatic impulses within the bells.

9. The combination with a receptacle for a pool of molten glass having an orifice in its lower side, of a bell positioned above said orifice, means for periodically reciprocating said bell, a second bell surrounding the first-named bell, means independent of the first-named means for periodically reciprocating the second bell, and means operable in timed relation to the reciprocatory movements of the bells for creating pneumatic impulses therein.

10. The method which comprises causing a flow of molten glass through an orifice at the bottom of a pool, constantly maintaining suctional impulses on the glass above the orifice to withdraw a quantity of glass therefrom, discharging the glass so withdrawn back into said pool, and periodically varying the degree of suctional impulse to vary the quantity withdrawn from the orifice and thereby oppose gravity flow to a desired degree.

11. The method of feeding molten glass, which consists in establishing a flow of glass from a pool to a submerged orifice, regulating the flow through the orifice by constantly applying suction impulses of varying intensity to the surface of the glass over the orifice to continuously withdraw varying quantities of the glass therefrom, and discharging such withdrawn glass back into said pool.

12. The method of feeding molten glass, which consists in establishing a flow of molten glass from a parent body to a pool and from the pool through an orifice, creating a second flow from said pool to retard the flow through the orifice and periodically increasing the quantity of the second flow from the pool to further retard the flow from the pool through the orifice.

ANDREW H. STEWART.